United States Patent
Hodgson

[11] Patent Number: 6,108,882
[45] Date of Patent: Aug. 29, 2000

[54] BRAKE SPRING TOOL

[76] Inventor: Dave Hodgson, 903 Sparrow Rd., Chesapeake, Va. 23325

[21] Appl. No.: 08/996,199

[22] Filed: Dec. 22, 1997

[51] Int. Cl.[7] .................................................. B23P 19/04
[52] U.S. Cl. .................................. 29/227; 29/267; 269/6
[58] Field of Search .......................... 29/227, 229, 240.5, 29/242, 257, 276, 270, 278, 267; 269/6

[56] References Cited

U.S. PATENT DOCUMENTS

| | | | |
|---|---|---|---|
| 2,042,287 | 5/1936 | Allievi et al. | 29/227 |
| 2,577,193 | 12/1951 | Imse | 29/277 |
| 4,625,353 | 12/1986 | Tamez et al. . | |
| 4,813,120 | 3/1989 | Fournier . | |
| 4,870,737 | 10/1989 | Navarro . | |
| 4,976,022 | 12/1990 | Thornton et al. . | |
| 5,075,945 | 12/1991 | Krzecki | 29/267 |
| 5,095,603 | 3/1992 | Carruthers et al. . | |
| 5,165,154 | 11/1992 | Miller . | |
| 5,191,690 | 3/1993 | Koehn . | |
| 5,237,729 | 8/1993 | Martin . | |
| 5,253,406 | 10/1993 | Shere et al. . | |
| 5,345,664 | 9/1994 | McMahon et al. . | |
| 5,367,755 | 11/1994 | Wood . | |
| 5,392,504 | 2/1995 | Calusinski . | |
| 5,455,996 | 10/1995 | Ploeger et al. | 269/6 |
| 5,507,083 | 4/1996 | Redgrave et al. . | |

Primary Examiner—David A. Scherbel
Assistant Examiner—Lee Wilson

[57] ABSTRACT

A tool facilitating removal of brake shoe hold down springs from a brake assembly including a handle with a bent shaft extending therefrom having a tip with C-shaped gap, having symmetrically-opposed end profiles, therein which retains the spring lead.

8 Claims, 2 Drawing Sheets

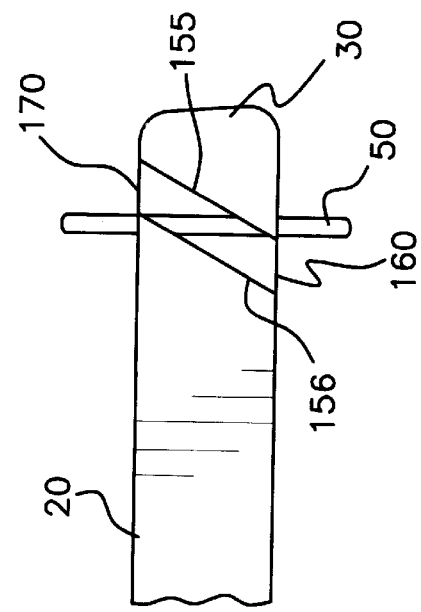
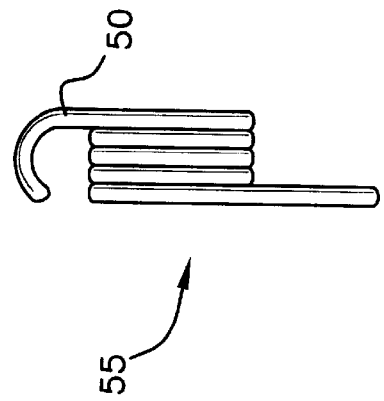
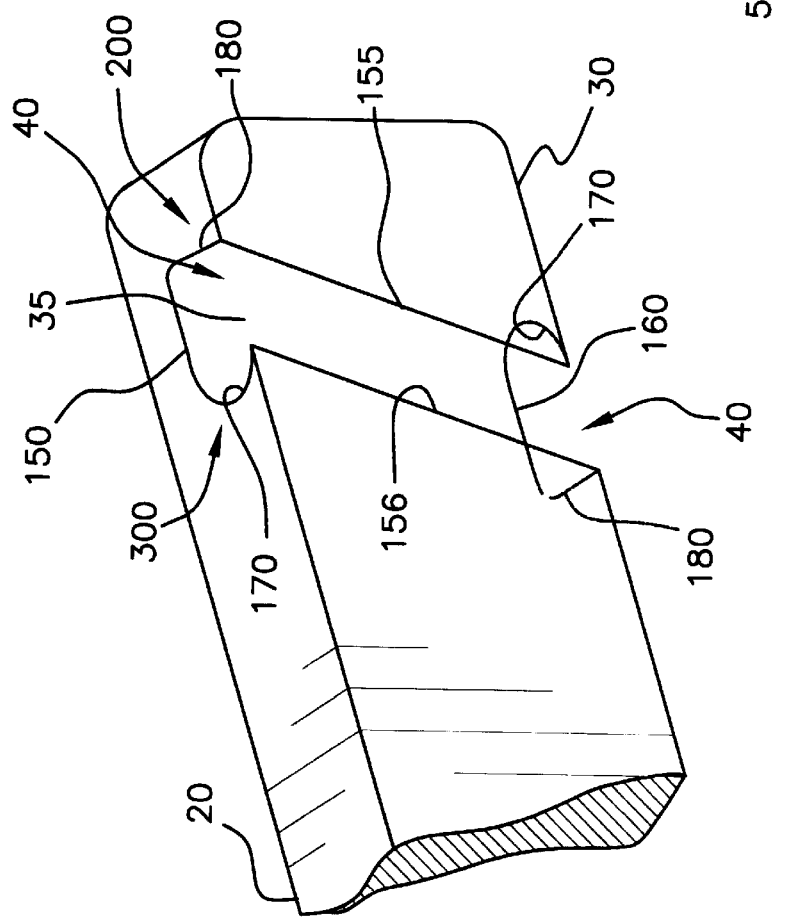

BRAKE SPRING TOOL

CLAIM OF PRIORITY

The present application incorporates and claims all benefits accruing under 35 U.S.C. §120, from Provisional Patent Application (serial number unassigned), entitled Brake Spring Tool, filed Jul. 8, 1997, in the United States Patent and Trademark Office. The present application also incorporates Document Disclosure No. 382044, entitled ????, filed Sep. 22, 1995, in the United States Patent and Trademark Office.

BACKGROUND OF THE INVENTION

1. Field of the Invention

The present invention relates to hand tools, and more particularly to hand tools for removing a spring from a drum brake on a motor vehicle.

2. Discussion of the Related Art

Drum brakes are well known in the art and need not be described in detail. It is sufficient to say that in operation, drum members concentric with a wheel of a vehicle are forced outward by a piston which causes the members to engage a portion of the rotating wheel to effect stopping. When the brakes are not in use, a biasing spring pulls the drum members radially inwardly, away from the wheels, preventing frictional interference. A brake shoe hold down spring aids in preventing frictional interference.

During the course of brake maintenance, it becomes necessary to remove the brake shoe hold down spring from the brake shoe. Tension in the spring makes it difficult to remove; therefore, there exists a need to provide a tool to facilitate the removal of the brake shoe hold down springs from the brake assembly in a reliable and secure way. Furthermore, because of the specific application of such a tool, it should not have a high cost; thus the tool should be designed so that it may be manufactured with relative ease.

Tools relating to brake springs tend to focus on different methods of gripping the brake spring. Some tools provide ease of use and/or construction simplicity. Some brake spring tools use a simple V-shaped cut with which to push on the spring. This allows an unsecured hold on the spring that sometimes results in inadvertent release of the spring not without unwanted consequences. Such a slip can be dangerous to the repair person. Improved tools combine modified V-shaped cuts or other solutions for removing brake springs. However, none show the particular characteristics of the present invention.

For example, U.S. Pat. No. 4,625,353, issued Dec. 2, 1986, to Tamez et al., describes a tool for adjusting a brake mechanism of a truck-trailer having socket members at one end of a long cylindrical member. The socket members have a plethora of modified cylindrical openings which are adapted to fit adjustment screws of different head configurations. A removable socket member is provided with a swivel device for use on awkwardly-located adjustment screws and for use with interchangeable sockets. The Tamez device is not adapted to be used for tightening brake springs, lacking structure accommodating a brake spring, as well as the angle of attack required to facilitate tightening.

U.S. Pat. No. 4,813,120, issued Mar. 21, 1989, to Fournier, describes a method for removing O-rings and backup rings from annular indentations. The tool described includes an elongated rod with curved prying portions at each end. The tool does not include a flat end formation that ensnares the lead of a brake spring during disassembly of same from a brake shoe.

U.S. Pat. No. 4,870,737, issued Oct. 3, 1989, to Navarro, describes a device having laterally-extending spurs which engage the coiled portion of the spring, allowing the user to remove or install the spring. The Navarro device has an unnecessary multiplicity of parts and does not grip a brake spring in as secure a manner as the present device.

U.S. Pat. No. 4,876,022, issued Dec. 11, 1990, to Thornton et al., describes a tool having a lever with a rectangular cross-section. The tool has a power arm, a work arm, having a mechanism to engage an anchoring loop, eye, or hook at the end of a helical spring, and a fulcrum member adapted to rest on the spring. The Thorton tool does not allow easy access to a brake spring.

U.S. Pat. No. 5,095,603, issued Mar. 17, 1992, to Carruthers et al., describes a drum brake service tool, and method of using the same, including a lever with a pair of spaced, parallel arms disposed at a first end, wherein the arms are adapted to receive a brake spring substantially perpendicular therebetween. The Carruthers et al. device is not of an ergonomic design, does not lend itself to ease of manufacture, and does not provide simple access to a brake spring.

U.S. Pat. No. 5,165,154, issued Nov. 24, 1992, to Miller, describes an apparatus for attaching and removing a spring connecting a set of brake shoes including a rigid plate which is adapted to be slidingly positioned between facing ends of brake shoes. A separate, hand-held instrument has a slot adapted to receive a spring lead and a contoured tip adapted to dislodge the spring lead from the brake shoe seat. The Miller device is limited by two separate elements which cooperate to manipulate the spring into proper engagement with the brake shoes.

U.S. Pat. No. 5,191,690, issued Mar. 9, 1993, to Koehn, describes a brake tool including an open socket-like working end with semi-circular mounting flanges adapted to position and secure a spring clip. The tool is not adapted to trap the elongate lead of a brake spring.

U.S. Pat. No. 5,237,729, issued Aug. 24, 1993, to Martin, describes a brake spring application device including a crook-shaped working end having a protrusion positioned at the outer central portion of the crook and lateral slot configured to secure the tool to a pin during dislodgement of the spring from the brake shoe. The tool is not configured to positively seize and maintain a brake spring lead during its dislodgement.

U.S. Pat. No. 5,253,406, issued Oct. 19, 1993, to Shere el al., describes a brake clip tool. The tool is not adapted to manipulation of brake springs.

U.S. Pat. Nos. 5,345,664, issued Sep. 13, 1994, to McMahon et al., and 5,507,083, issued Apr. 16, 1996, to Redgrave et al., illustrate apparatuses for removing brake springs. Each apparatus includes an elongated lever having a bifurcated gripping member designed to fit over a lip of a lower brake shoe. Then the elongated lever may be rotated until the other end thereof may be placed around a brake spring shaft of a brake spring, thereby allowing the brake spring to be removed. The tool is configured such that a different length lever must be used for every brake size and there is the danger that the lever might slip before the spring is released.

U.S. Pat. No. 5,367,755, issued Nov. 29, 1994, to Wood, describes an expansion tool adapted to manipulate a spring. The tool is not adapted to seize and securely remove a brake spring lead from a brake shoe.

U.S. Pat. No. 5,392,504, issued Feb. 28, 1995, to Calusinski, describes a tool for removal of retaining spring clips on rail way tracks. The device is not intended to remove, thus does not accommodate automotive brake springs.

U.S. Pat. No. 5,455,996, issued Oct. 10, 1995, to Ploeger et al., illustrates a brake spring roll hand tool for removing springs from brake drums. The device includes a straight shaft with a threaded end. A collar, having a notch angled back toward the handle, has an axial threaded passage in communication with the notch such that the threaded shaft may be received therein to trap a spring lead in the notch. Because brake springs typically tend to be located in such a manner as to prevent a straight shafted tool from reaching the leads thereof, the Ploeger et al. tool may not be useful in many applications. Also the tool requires two, machined, interconnecting parts. Further, the threaded clamping system requires considerable time positioning the tool and securing the spring lead therein, which slows the repair process.

In light of the above, despite the attempts made by the prior art devices, there still exists a need for an improved brake spring tool which allows quick yet functional access to brake spring lead. None of the prior art patents, taken alone or in combination, teaches or suggests the presently claimed brake spring tool.

SUMMARY OF THE INVENTION

The present invention provides a tool to facilitate the removal of brake shoe hold down springs from a brake assembly in a reliable and secure way, while at the same time allowing for better handling of the spring. The tool has a tip with a C-shaped cut therein which allows for the spring to be held much more securely while still allowing the spring wire to be grabbed with relative ease. Additionally, the C-shaped cut is configured relative to the handle of the tool such that it always is positioned at the proper angle relative to the part of the spring which it receives. The user does not have to twist and turn the present invention to position it on the spring.

Accordingly, a first object of the invention is to provide an improved brake spring tool facilitating easy removal of a brake spring from a brake assembly.

A second object of the invention is to provide an improved brake spring tool that securely retains a brake spring during removal of same from a brake assembly.

A third object of the invention is to provide an improved brake spring tool that requires no supplementary tools in order to safely and easily remove a brake spring.

A fourth object of the invention is to provide an improved brake spring tool that is configured to accommodate a nonlinear pathway presented by a brake assembly in order access a brake spring.

A fifth object of the invention is to provide improved elements and arrangements thereof, in an apparatus for the purposes described which is inexpensive, dependable and effective in accomplishing its intended purposes.

These and other objects of the present invention will become readily apparent upon further review of the following specification and drawings.

BRIEF DESCRIPTION OF THE DRAWINGS

A more complete appreciation of the invention, and many of the attendant advantages hereof, readily will be apparent as same becomes better understood by reference to the following detailed description when considered in conjunction with the accompanying drawings in which like reference symbols indicate the same or similar components, wherein:

FIG. 2 is a partial enlarged top right rear perspective view of a tip of a brake spring tool constructed according to the principles of the present invention;

FIG. 3 is a partial enlarged right side elevational view of a tip of a brake spring tool constructed according to the principles of the present invention engaging a lead of a brake spring; and FIG. 4 is right side elevational view of a standard brake spring.

DETAILED DESCRIPTION OF THE PREFERRED EMBODIMENTS

Figure 1:
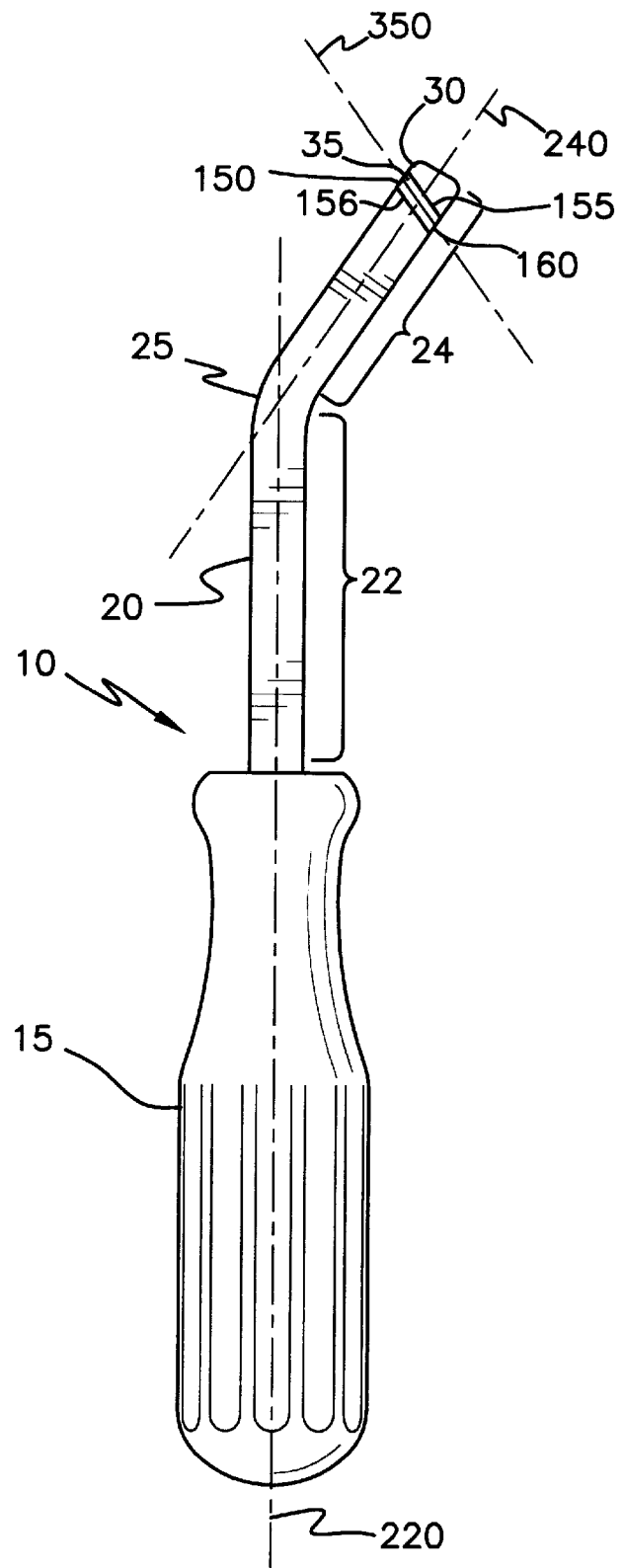
FIG. 1 is a right side elevational view of a brake spring tool constructed according to the principles of the present invention.

Turning to FIGS. 1 and 2, a brake spring tool (10) constructed according to the principles of the present invention includes a handle (15) attached to a rigid shaft (20).

The handle (15) is of conventional design. Although the handle (15) is shown generally surrounding the bottom of the rigid shaft (20), the handle (15) may be configured in any fashion furthering the principles of the present invention. Variations of handle (15) are contemplated, such as rubber grips (not shown) and extension members (not shown).

The shaft (20) has two segments (22) and (24), each defining a central axis (220) and (240), respectively. A bend (25) is interposed between segment (22) and segment (24), preferable such that axes (220) and (240) define an angle of approximately 30°. The bend (25) generally is positioned closer to the tip (30) than to the handle (15). In one embodiment of the present invention, the shaft (20) is constructed from ⁵⁄₁₆-inch square rod, as shown in FIG. 2. The segment (24) has an upper surface (400), a lower surface (410) and an intermediate surface (420). In another embodiment of the present invention, the shaft (20) is constructed from cylindrical rod, as shown in FIG. 1.

The shaft (20) terminates in a tip (30). The tip (30) is notched to form a gap (35) having a central axis (350). Preferably, the gap (35) is not parallel with the handle (15), rather the axis (350) and (220) define an angle of approximately 20°.

Referring to FIG. 3, special design considerations have been incorporated in the gap (35) to ensure proper engagement with brake spring (55), shown in FIG. 3 and FIG. 4. The gap (35) essentially is C-shaped in profile, having an opening (40) which is smaller than the interior thereof. The opening (40) of the gap (35) is formed by a first transverse edge (155) and a second transverse edge (156). The C-shaped gap (35) has an the upper end (150) and a lower end (160), each having symetrically-disposed concave formations (170) and flat formations (180). Specifically, from end (150) to end (160), referring to the distal side (200) of the gap (35), the profile of the gap (35) tapers from a flat formation (180) to a concave formation (170). With respect to the inner side (300) of the gap (35), the profile of the gap (35) tapers symmetrically oppositely: from a concave formation (170) to a flat formation (180).

The symettrically-disposed concave and flat formations seize and retain the lead (50) of the spring (55) during its removal or installment. Once the lead (50) is received in the gap (35), the concave formations (170) engage and retain the lead (50), as shown in FIG. 3. Preferably, the opening (40) closely receives the lead (50) of brake spring (55) so as to assure retainance of the lead (5) therein. The opening (40) of the gap (35) is formed by the first transverse edge (155) and the second transverse edge (156). The first transverse edge (155) is adjacent to the distal side (200) of the gap (35) and runs along the top of the gap (35) from the flat formation (180) to the concave formation (170). The second transverse edge (156) is adjacent to the inner side (300) of the gap (35) and runs along the top of the gap (35) from the concave formation (170) to the flat formation (180). Thus, the opening (40) has a small width between the first transverse edge (155) and the second transverse edge (156) for reception of the lead (50) within the gap (35). The small width of the opening (40) between the first transverse edge (155) and the second transverse edge (156) is smaller than any other width measured from the distal side (200) of the gap (35) to the inner side (300) of the gap (35).

In operation, the tool (10) is manipulated such that the tip (30) passes by the various components of a drum brake system (not shown) until it engages with the drum brake spring (55). The shaft (20) allows the user to reach the spring (55) on certain types of drum brake systems, making the removal of the spring (55) significantly easier, especially when the spring (55) is not directly accessible by other means. The opening (40) receives the lead (50) of the drum brake spring (55) and upward pressure then is applied to the tool handle (15).

As can be seen in FIG. 1, the gap (35) has been bored into the portion (24) of the shaft (20) such that the axis (350) lies in substantially the same plane as the axis (220) of the handle (15). This allows for better control of the spring (55), as the inside of the C-shaped gap (35) always is parallel with the lead (50) of the spring (55) engaged. Although the opening (40) is large enough to allow the lead (50) to pass therein, it must be small enough so that passage therefrom is not easily accomplished. Once the lead (50) has passed through the opening (40), the spring (55) is engaged by the gap (35). Further manipulation of the present invention allows the gap (35) to grasp the lead (50) allowing the user to disengage it from the spring retainer pin (not shown). Then, the spring (55) may be removed from the brake shoe (not shown) and disengaged from the gap (35). Replacement of the spring (55) is accomplished by reversing the above order of steps. Once the spring (55) has been replaced, the tip (30) is pulled directly away from the lead (50), disengaging it from the spring (55).

The design of the brake spring tool (10) allows the user to quickly move it through various types of drum brake assemblies (not shown) and to locate the drum spring (55). The gripping gap (35) quickly, easily and securely receives the spring lead (50), allowing for prompt insertion or removal of the spring (55). The unitary construction of the tool (10) assures durability, in that there are no moving parts to break or malfunction due to articulation stress.

The present invention is not limited to the above, but encompasses all modifications and improvements falling within the scope of the appended claims.

I claim:

1. An apparatus for removing a spring from a brake drum comprising a shaft having a tip with a gap having:

an opening defined by a first transverse edge of an intermediate surface of said apparatus and a second transverse edge of said intermediate surface, a distance between said first transverse edge and said second transverse edge being the smallest width of said gap, said opening forming in an upper surface and a lower surface of said apparatus; and each upper surface and lower surface having a distal side having a flat formation and inner side with a concave formation at said opening;

whereby inner sides of said gap prevent the dislodging of a spring which has passed through the opening.

2. The apparatus of claim 1, wherein only an upper end of said gap has a distal side having a flat formation and an inner side with a concave formation;

a lower end of said gap having a distal side with a concave formation and an inner side with a flat formation.

3. The apparatus of claim 1, wherein an axis of said gap and an axis of said shaft define an angle greater than zero.

4. The apparatus of claim 3, wherein said angle is 20 degrees.

5. The apparatus of claim 1, wherein said opening closely receives a lead of the spring.

6. The apparatus of claim 1, including a handle mounted on said shaft.

7. The apparatus of claim 1, wherein said shaft has a bend therein.

8. The apparatus of claim 7, wherein said bend is interposed between a first segment of said shaft, having a first segment axis, and a second segment of said shaft, having a second segment axis, said first segment axis and said second segment axis defining an angle of 30 degrees.

* * * * *